United States Patent
Dropps

(10) Patent No.: US 9,170,880 B1
(45) Date of Patent: Oct. 27, 2015

(54) METHOD AND SYSTEM FOR DATA INTEGRITY IN TCAMS

(71) Applicant: QLOGIC, Corporation, Aliso Viejo, CA (US)

(72) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 94 days.

(21) Appl. No.: 14/048,849

(22) Filed: Oct. 8, 2013

(51) Int. Cl.
*G11C 29/00* (2006.01)
*G06F 11/10* (2006.01)

(52) U.S. Cl.
CPC .................................. *G06F 11/1064* (2013.01)

(58) Field of Classification Search
CPC . H04L 49/552; H04L 49/354; H04L 49/3009; G11C 15/04; G11C 2029/0411; G11C 15/00; G11C 2207/104; G11C 2029/0409; G11C 29/42; G11C 29/4401; G11C 29/816; G11C 29/44; G06F 11/106; G06F 11/1666; G06F 11/1068; G06F 11/1064; H03M 13/09
See application file for complete search history.

(56) References Cited

U.S. PATENT DOCUMENTS

| | | | |
|---|---|---|---|
| 5,491,703 A * | 2/1996 | Barnaby et al. | 714/766 |
| 6,597,595 B1 * | 7/2003 | Ichiriu et al. | 365/49.18 |
| 7,050,318 B1 * | 5/2006 | Argyres | 365/49.15 |
| 7,304,873 B1 * | 12/2007 | Gupta | 365/49.1 |
| 7,304,875 B1 * | 12/2007 | Lien et al. | 365/49.1 |
| 8,364,852 B1 * | 1/2013 | Shukla et al. | 710/3 |
| 2005/0060631 A1 * | 3/2005 | Driediger | 714/763 |
| 2005/0074009 A1 * | 4/2005 | Kanetake et al. | 370/392 |
| 2008/0008202 A1 * | 1/2008 | Terrell et al. | 370/401 |
| 2008/0049522 A1 * | 2/2008 | Cohen | 365/189.07 |
| 2012/0110411 A1 * | 5/2012 | Cheung et al. | 714/758 |

OTHER PUBLICATIONS

Sideris, et al., "Cost Effective Protection Techniques for TCAM Memory Arrays", *IEEE Transactions on Computers*, vol. 61, No. 12, (Dec. 2012),1778-1788.

* cited by examiner

*Primary Examiner* — Guerrier Merant
(74) *Attorney, Agent, or Firm* — Klein, O'Neill & Singh, LLP

(57) ABSTRACT

Method and system for a network device are provided. The method includes generating error correction code (ECC) for writing data to a ternary content addressable memory used by the network device; storing the ECC code and the data at the TCAM; generating an ECC for a search key, used for searching the TCAM; and detecting any error in the stored data by using the search key with appended ECC.

20 Claims, 6 Drawing Sheets

METHOD AND SYSTEM FOR DATA INTEGRITY IN TCAMS

TECHNICAL FIELD

The embodiments disclosed herein are related to data integrity in computing devices and more particularly, in networking devices.

RELATED ART

Network devices are commonly used to move network information (which may also be referred to interchangeably, as frames, packets, data or commands) between computing systems (for example, servers) or between computing systems and network devices (for example, storage systems). Various hardware and software components are used to implement network communication. Network devices for example, switches, adapters and others typically communicate using ports that have logic and circuitry for sending and receiving information. The ports typically use receive buffers (or memory storage devices) for receiving and temporarily storing information (for example, frames, packets and other information), before information is sent to an appropriate destination.

Physical size of computing devices and the memory structures used by such devices continue to shrink making them susceptible to single event based errors. Data stored at memory devices ought to be checked for errors and protected. One way to detect and correct errors is by using error correcting code (ECC).

ECC is typically used by data storage and transmission devices. When data is written to a storage location, ECC is computed and stored alongside the data. When the data is read back, the ECC is typically recomputed and compared against ECC stored at the storage location. Any discrepancy is an indication of bit errors in the stored data. By examining the discrepancies between the ECCs, errors can be detected and fixed. Typically, an ECC algorithm is applied to a fixed number of data bits, for example, 32, 64, 128, 256, 512 or 1024 bits. Hamming code and BCH are two examples of using ECC.

Data that is stored in static random access memory (SRAM) and/or dynamic random access memory (DRAM) used by network devices is typically protected. However, data stored at TCAMs (ternary content addressable memory) is not typically protected. One reason for not protecting TCAM data is that it has been considered to be complex because it requires reading matching TCAM entries, before detecting errors. The read operations consume bandwidth and power. It is desirable to protect TCAM data because TCAMs may be used to store network routing information and other information type. Continuous efforts are being made to protect TCAM data.

BRIEF DESCRIPTION OF THE DRAWINGS

The various present embodiments now will be discussed in detail with an emphasis on highlighting the advantageous features. These embodiments depict the novel and non-obvious systems and methods for network devices shown in the accompanying drawings, which are for illustrative purposes only. These drawings include the following figures, in which like numerals indicate like parts.

DETAILED DESCRIPTION

Figure 1:
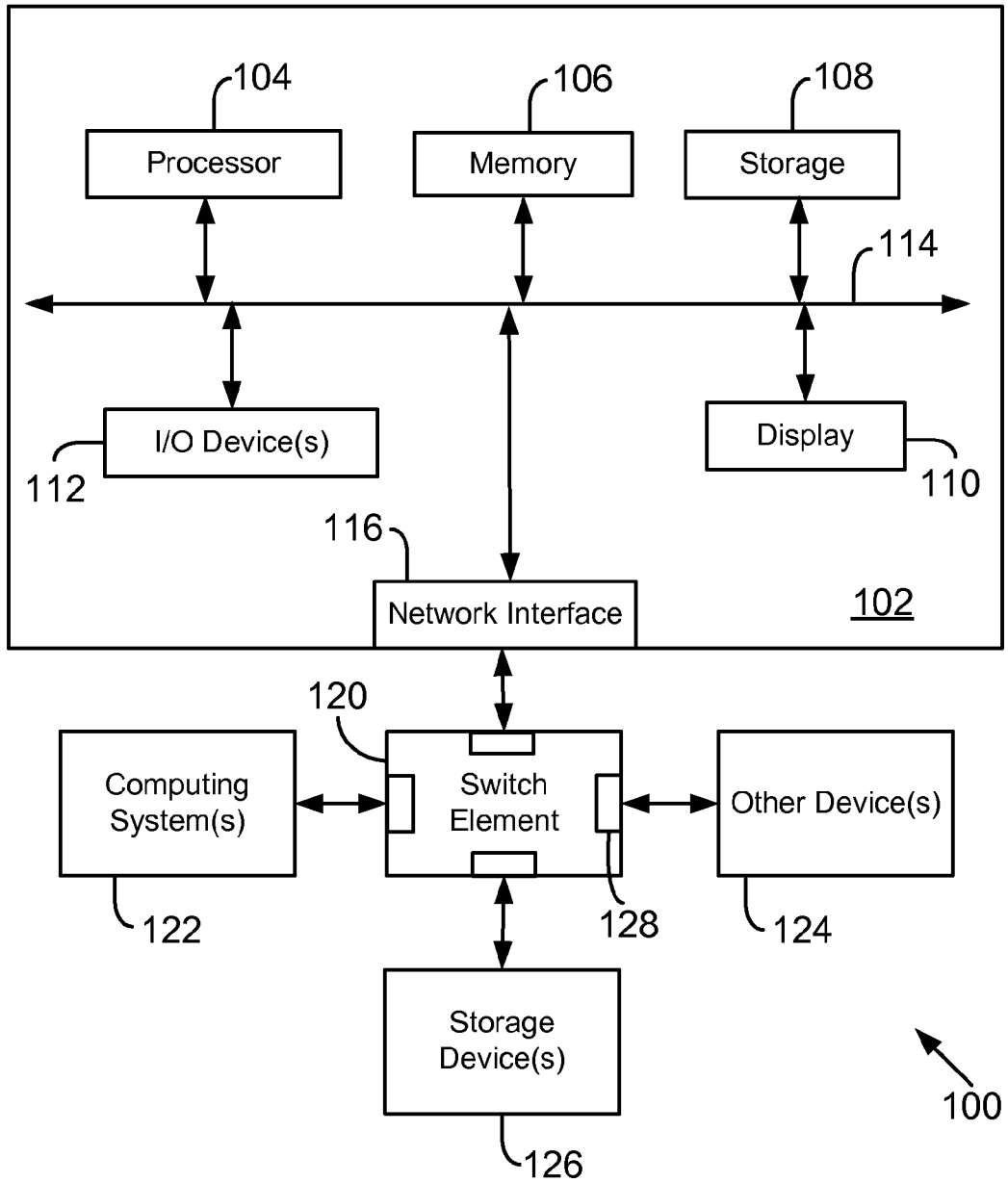
FIG. 1 shows an example of a system using the present embodiments.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media may also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory computer-readable media. The computer program product may be non-transitory, computer storage media, readable by a computer device, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments may be described herein with reference to the Fibre Channel, FCoE and Ethernet protocols. However, these protocols are used merely for ease of reference and to provide examples. The present embodiments are not limited to Fibre Channel, FCoE and Ethernet or any other standard.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual frames (or packets). Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use Gigabit Ethernet networks (or higher speeds) while preserving the Fibre Channel protocol.

The systems and processes described below are applicable and useful in the upcoming cloud computing environments. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor/processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse and others. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, a host bus adapter, a network interface card or any other network adapter type. The embodiments described herein may be implemented in network interface 116.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports 128. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 the host system 102 and an interface (not shown) for the storage devices 126. Fabric ports are typically located in Fabric devices, such as a network switch element, for example, switch element 120.

Figure 2:
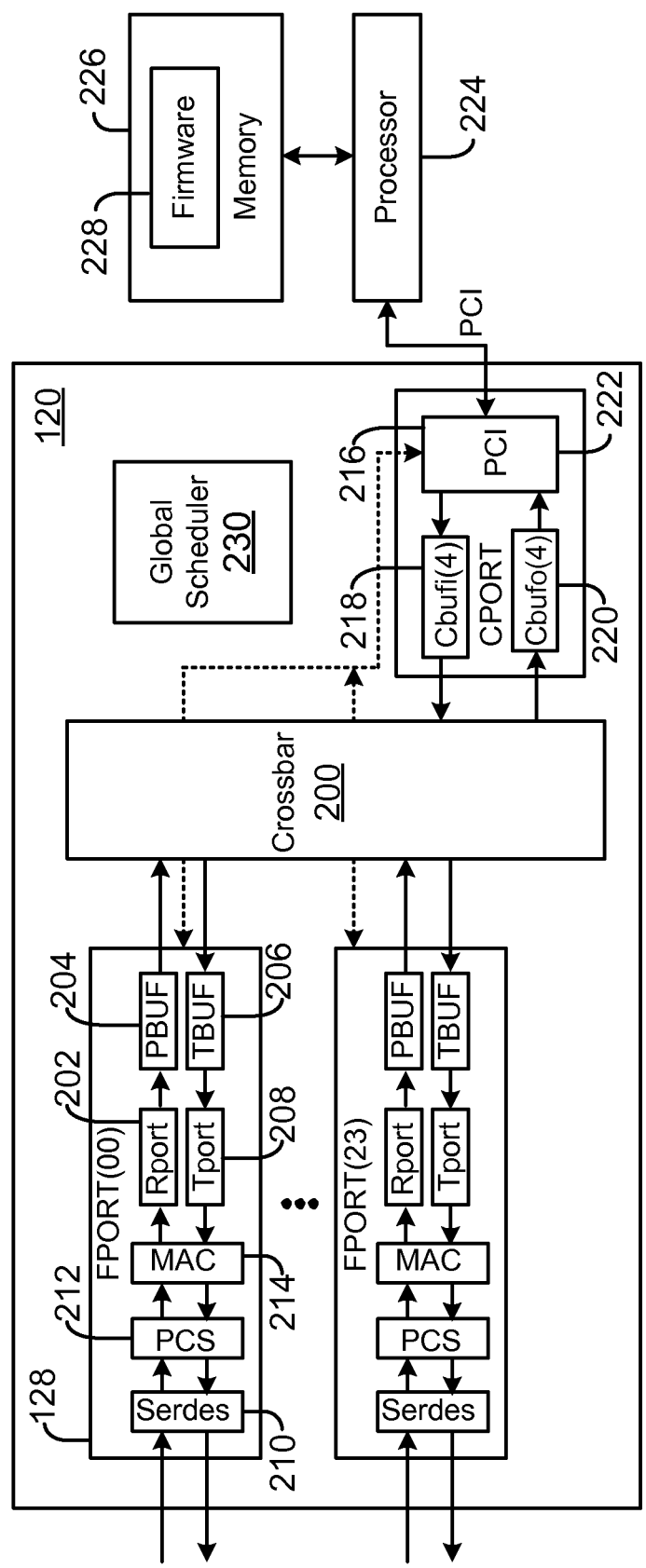
FIG. 2 shows an example of a switch element used in the system of FIG. 1.

FIG. 2 is a high-level block diagram of switch element 120, also referred to as the switch 120. It is noteworthy that the embodiments disclosed herein are not limited to switch element 120 and may be implemented and practiced in other network device type, for example, adapter, NICs and other device types.

Switch element 120 may be implemented as an application specific integrated circuit (ASIC) having a plurality of ports 128. Frames are received at ports 128 and a global scheduler 230 (also referred to as scheduler 230) then schedules frame processing/transmission by ports 128.

Ports 128 are generic (GL) ports and may include an N_Port, F_Port, FL_Port, E-Port, or any other port type. Ports 128 may be configured to operate as Fibre Channel, FCoE or Ethernet ports. In other words, depending upon what it is attached to, each GL port can function as any type of port. As an example, ports 128 of FIG. 2 are drawn on the same side of the switch element 120. However, ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT (or receive segment) 202 temporarily stores received frames at a memory storage device, shown as PBUF (pause buffer) 204. The frames are then sent to a transmit segment (or transmit port (TPORT) 208 via the crossbar 200. The TPORT 208 includes a memory device shown as a transmit buffer (TBUF) 206. The TBUF 206 may be used to stage frames or information related to frames before they are transmitted. The TPORT 208 may also include a shared MAC and PCS or use the MAC and PCS of RPORT 202. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port 128 to be configured into a plurality of independently, operating sub-ports, each uniquely identified for receiving and sending frames. The sub-port configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Port 128 may use TCAMs to store routing information. A TCAM memory as a CAM maps a key to a data value. In contrast to a simple CAM memory, a TCAM may include "don't care" bits in its entries, which are ignored during a search.

A TCAM cell typically includes two SRAM cells and matching logic. During a search, a match line is connected to the TCAM cells is pre-charged and if there is at least one cell that does not match, then the match line is driven low, indicating a no match. In a typical TCAM search, a key is used as an input to a TCAM and if there is a match, then the corresponding data from a RAM array is fetched. If there are multiple hits, then a priority encoder gives priority to one of the hits.

The TCAM used by ports 128 may include wordlines, where each wordline includes a certain number of bits. For each bit in a wordline, the TCAM may include storage elements, designated as X(i) and Y(i). The value of X(i) and Y(i) determine a search criteria. The TCAM may store fields that are compared to fields in a packet received by a port. It is desirable to protect the TCAM information because TCAMs are susceptible to single bit errors. The embodiments described herein protect TCAM information.

The X and Y values of a TCAM entry are different, with 4 possible codes for each bit entry, for example, a (0,0) indicates a "never match", (0,1) indicates a match on 1, (1,0) indicates a match on 0 and (1,1) indicates an "always match. When the never match condition is set, there is no need to check for errors as any bit and all bits could have this code set. If one bit is upset to a wrong value, all the other bits will still perform a desired function. The embodiments described herein protect data for the "0" and "1" cases, as described below.

Figure 3:
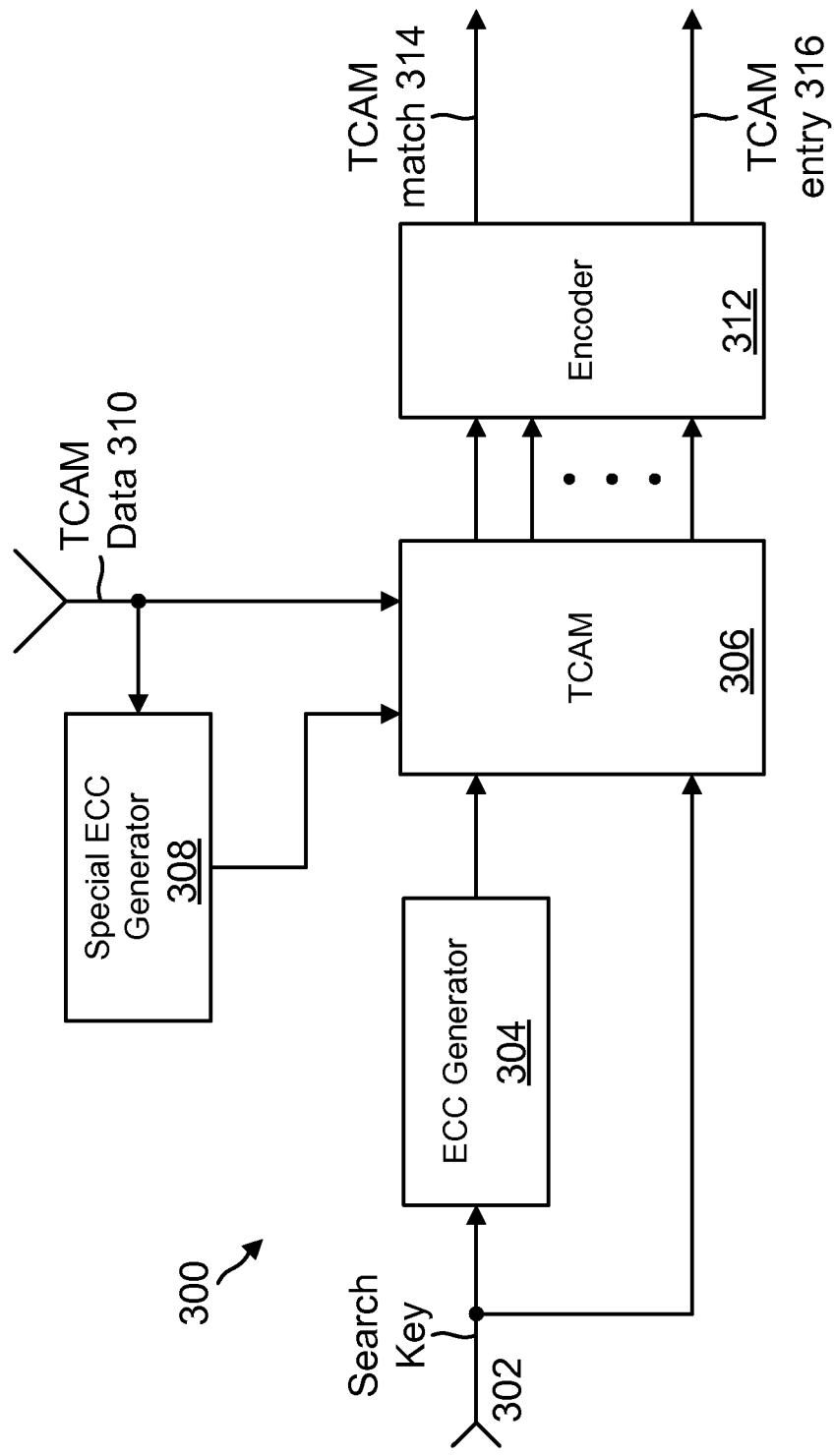
FIG. 3 is a functional block diagram of an error detection system for TCAMs, according to the present embodiments.

FIG. 3 shows a system 300 for protecting TCAM data, according to one embodiment. System 300 includes a TCAM 306 that may be used to store a plurality of entries. When data 310 is written to the TCAM 306, a special ECC generator 308 is used to generate the appropriate ECC for data 310. It is noteworthy that between X and Y values for an entry, one of the values is the value for the search data and the other one is the complement of the search data.

A search key 302 is used to search the TCAM 306. The search key 302 is fed into a ECC generator 304. The ECC generator 304 adds an ECC value to the search key 302. The ECC value then becomes a part of the normal TCAM search. If a bit error occurs, the entry will fail to match, when it should have. This will result in an error condition because there will be no TCAM match. The processor 224 can be notified for taking any corrective action.

If there are no errors, then the TCAM hits are encoded by the priority encoder 312. The RAM, not shown, is read based on a TCAM match 314 and TCAM entry 316.

Figure 4:
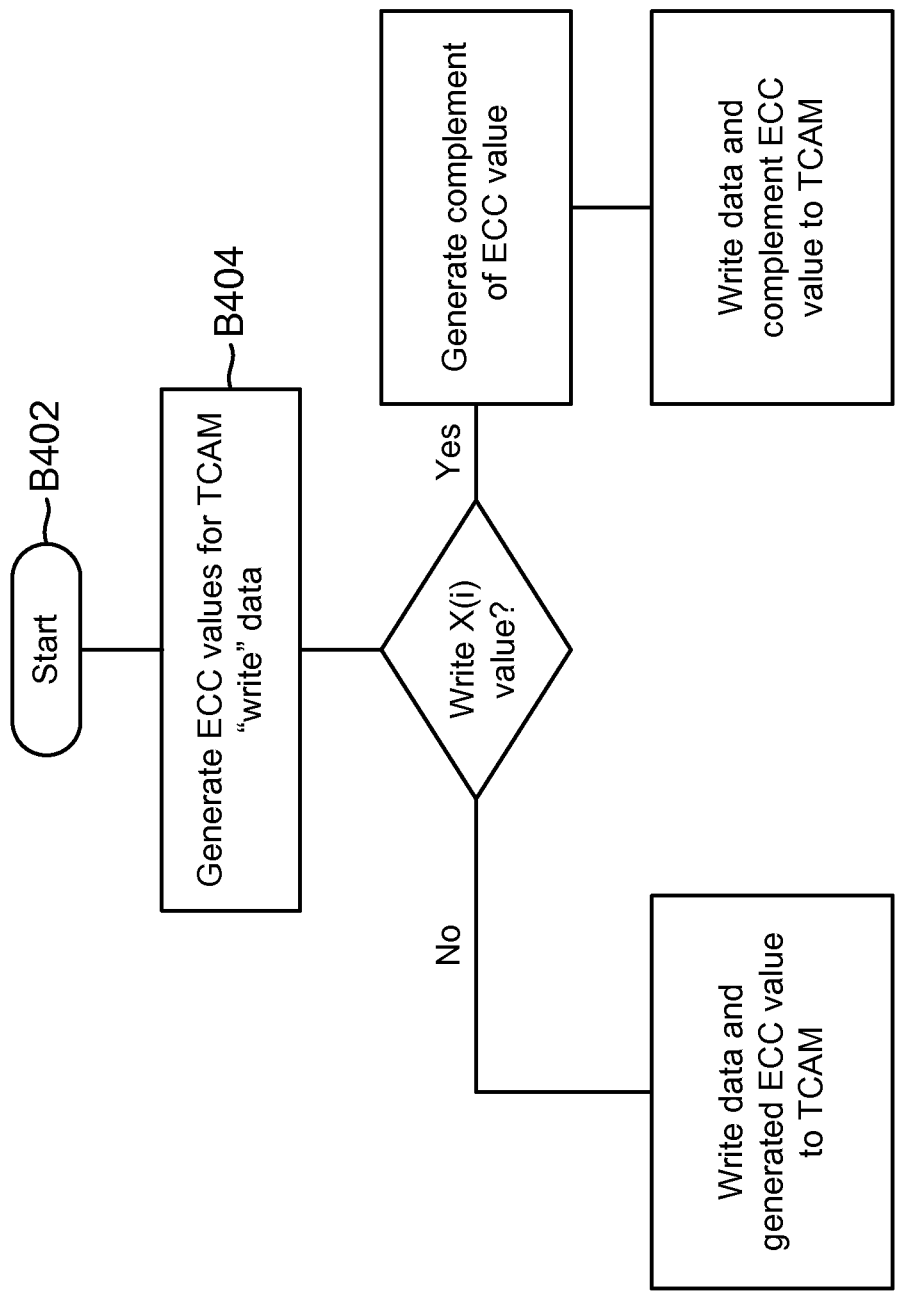
FIG. 4 shows a process flow diagram for writing to a TCAM using ECC, according to one embodiment.

FIG. 4 shows a process 400 for using system 300, according to one embodiment. The process begins in block B402. In block B404, ECC values are generated for data 310. The ECC value is generated by the special ECC generator 308 and stored at TCAM 306.

In block B406, the process determines if an X value for an entry is to be written. If yes, then in block B408, a complement of the ECC value is created. For example, if the normal ECC value calculated for the X value being written into the TCAM was a hexadecimal value of 0x55, then the value that actually gets written into the TCAM for the ECC bits X value would be a hexadecimal value of 0xCC. Thereafter, in block B410, data 310 is written with the complement ECC value to TCAM and the process is complete in block B414.

If in block B406, the X value is not being written, then data 310 and the ECC value that is generated in block B404 are written and the process ends.

Figure 5A:
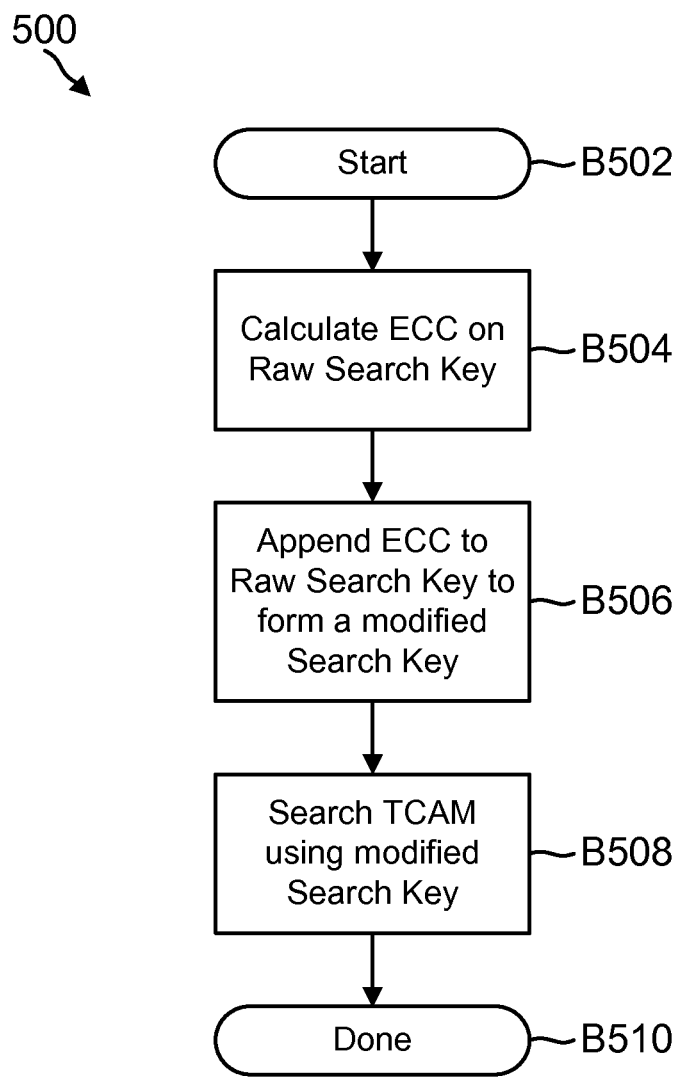
FIGS. 5A/5B show process flow diagrams for searching a TCAM using a search key with appended ECC, according to one embodiment.

FIG. 5A shows a process 500 for searching TCAM 306 (FIG. 3) with a search key appended with ECC, according to one embodiment. The process begins in block B502. In block B504, ECC is determined on a raw search key 302. The ECC is generated by ECC generator 304.

In block B504, the generated ECC is appended to the search key 302, resulting in a "modified search key". The modified search key is then used in block B508 to search the TCAM 306. Thereafter, the process ends in block B510.

Figure 5B:
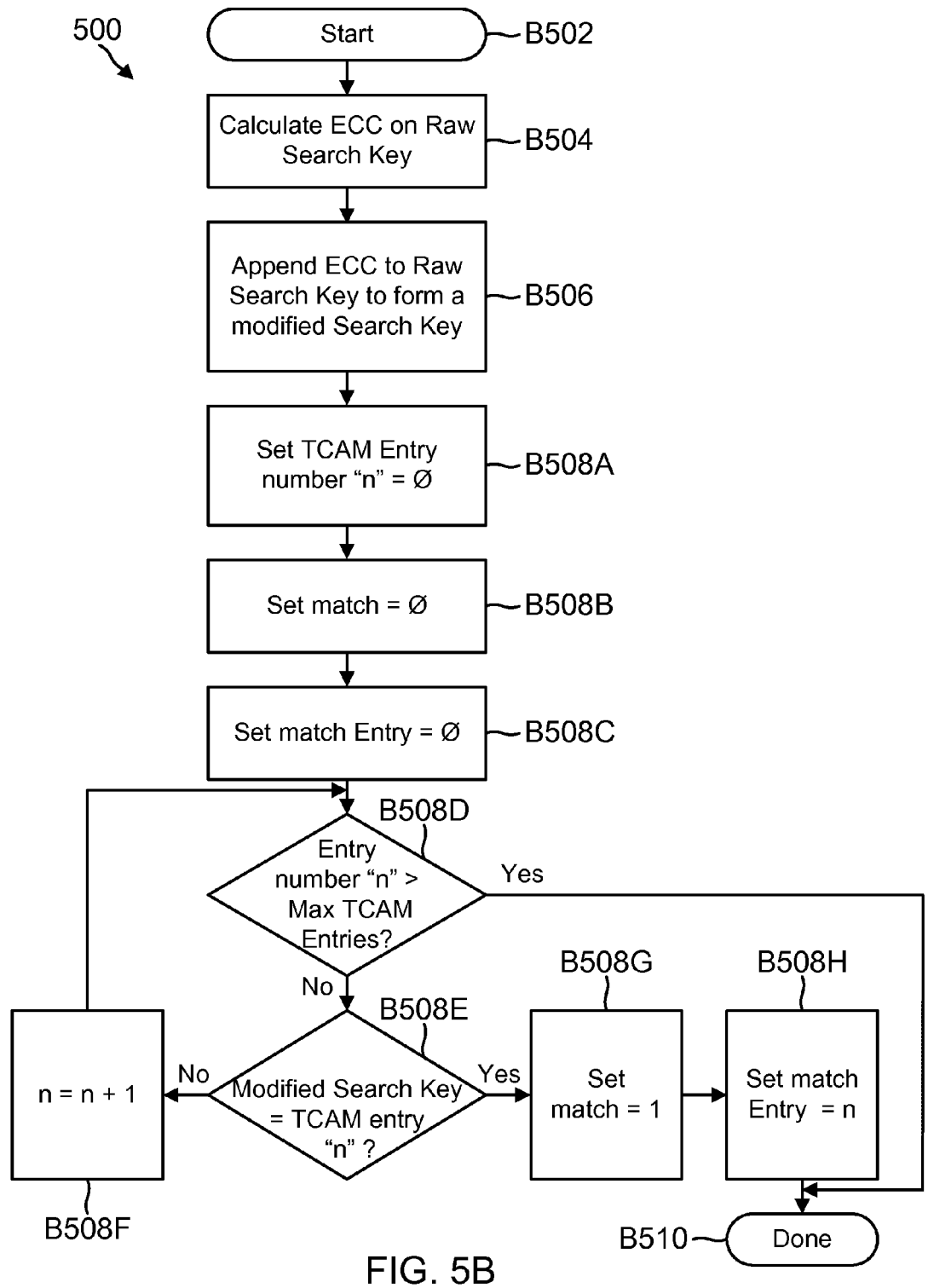

Details regarding block B508 are provided in FIG. 5B as B508A-B508H. In block B508A, the TCAM entry that is being processed at any given time is set to "n". In block B508B, the TCAM is configured such that a value of "0" indicates a match and when there is a match the entry is set to 0 in block B508C.

In block B508C, the process determines if an entry number "n" is greater than the maximum number of TCAM entries. If yes, the process ends at block B510. If not, then in block B, the process compares modified search key to determine if there is a match. If there are no errors and there is a match, then in block B508G, the match is set to 1 and the match entry is set to n. If there is an error, then in block B508F, the process moves to the next entry (i.e. n+1) and the process reverts back to block B508D.

Because ECC checking is integrated into the normal function of the TCAM search, no special processing of the search ECC is required. The ECC of the search key is computed using standard techniques and appended to the original search key to form a larger search key to apply to the TCAM for processing. The embodiments presented have the advantage of not requiring a read of any matching TCAM entry data to check for a bit error. This provides more bandwidth and an energy efficient method for TCAM error protection. It also does not allow false TCAM matches to occur due to bit errors in the TCAM stored data.

In one embodiment, a network device using a TCAM for storing a plurality of entries is provided. The network device includes a first error correction code (ECC) generator (308) for generating ECC for data that is written to the TCAM; and a second ECC generator (304) for appending ECC to a search key 302 used for searching the TCAM. The search key with the appended ECC is used to search for TCAM entries and detect any errors without having to read data stored at the TCAM.

In yet another embodiment, a machine implemented method for a network device is provided. The method includes generating error correction code (ECC) for writing data to a TCAM used by the network device; storing the ECC code and the data at the TCAM; generating an ECC for a search key, used for searching the TCAM; and detecting any error in the stored data by using the search key with appended ECC, during a TCAM search operation.

In another embodiment, a method for detecting error at a TCAM of a network device is provided. The method includes storing error correction code (ECC) and the data at the TCAM used by the network device; appending an ECC to a search key that is used for searching the TCAM; detecting any error in the stored data by using the search key with the appended ECC during a search operation; and notifying a processor of the network device regarding any detected error.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters and other network devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device comprising:
a plurality of ports for receiving and sending information;
a ternary content addressable memory (TCAM) for storing a plurality of entries and for storing routing information;
a first error correction code (ECC) generator for generating ECC that is appended to data that is written to the TCAM; and
a second ECC generator for appending ECC to a search key used for searching the TCAM; wherein the search key with the appended ECC is used to search for TCAM entries to 10 detect any bit errors without having to read any data associated with the data stored at the TCAM.

2. The network device of claim 1, wherein the network device is a switch element.

3. The network device of claim 2, wherein at least one of the plurality of ports of the switch element is configured to operate as a Fibre Channel port.

4. The network device of claim 2, wherein at least one of the plurality of ports of the switch element is configured to operate as an Ethernet port.

5. The network device of claim 2, wherein at least one of the plurality of ports of the switch element is configured to operate as a Fibre Channel over Ethernet port.

6. The network device of claim 1, wherein the network device is an adapter for sending and receiving information.

7. The network device of claim 1, wherein if any error is detected during a TCAM search, then a processor of the network device is notified of the error.

8. A machine implemented method for a network device, comprising: generating error correction code (ECC) for writing data to a ternary content addressable memory (TCAM) used by the network device, wherein the network device comprises a plurality of ports for receiving and sending information and the TCAM is used for storing routing information; storing the ECC code and the data at the TCAM, wherein the ECC code is appended to the data; generating an ECC for a search key, used for searching the TCAM; and detecting any error in the stored data by using the search key with appended ECC, during a TCAM search operation.

9. The method of claim 8, further comprising:
notifying a processor of the network device regarding any detected error.

10. The method of claim 9, wherein the network device is a switch element.

11. The method of claim 9, wherein at least one of the plurality of ports of the switch element is configured to operate as a Fibre Channel port.

12. The method of claim 9, wherein at least one of the plurality of ports of the switch element is configured to operate as an Ethernet port.

13. The method of claim 9, wherein at least one of the plurality of ports of the switch element is configured to operate as a Fibre Channel over Ethernet port.

14. The method of claim 8, wherein the network device is an adapter for sending and receiving information.

15. A method for detecting error in a ternary content addressable memory (TCAM) of a network device, comprising: storing error correction code (ECC) and the data at the TCAM used by the network device, wherein the network device comprises a plurality of ports for receiving and sending information and the TCAM is used for storing routing information, and wherein the ECC is appended to the data as stored in the TCAM; appending an ECC to a search key that is used for searching the TCAM; detecting any error in the stored data by using the search key with the appended ECC during a search operation; and notifying a processor of the network device regarding any detected error.

16. The method of claim 15, wherein the network device is a switch element.

17. The method of claim 16, wherein at least one of the plurality of ports of the switch element is configured to operate as a Fibre Channel port.

18. The method of claim 16, wherein at least one of the plurality of ports of the switch element is configured to operate as an Ethernet port.

19. The method of claim 16, wherein at least one of the plurality of ports of the switch element is configured to operate as a Fibre Channel over Ethernet port.

20. The method of claim 15, wherein the network device is an adapter for sending and receiving information.

* * * * *